United States Patent
Lin

(10) Patent No.: US 9,253,668 B2
(45) Date of Patent: Feb. 2, 2016

(54) VOIP BANDWIDTH MANAGEMENT SYSTEM AND METHOD THEREOF

(71) Applicant: HON HAI PRECISION INDUSTRY CO., LTD., New Taipei (TW)

(72) Inventor: Han-Tzung Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 213 days.

(21) Appl. No.: 13/864,225

(22) Filed: Apr. 16, 2013

(65) Prior Publication Data

US 2014/0133326 A1    May 15, 2014

(30) Foreign Application Priority Data

Nov. 15, 2012    (CN) .......................... 2012 1 0459426

(51) Int. Cl.
| | |
|---|---|
| *H04L 12/911* | (2013.01) |
| *H04W 24/08* | (2009.01) |
| *H04W 76/02* | (2009.01) |
| *H04L 29/06* | (2006.01) |
| *H04W 28/20* | (2009.01) |

(52) U.S. Cl.
CPC ........... *H04W 24/08* (2013.01); *H04L 65/1069* (2013.01); *H04L 65/80* (2013.01); *H04L 69/24* (2013.01); *H04W 76/022* (2013.01); *H04W 28/20* (2013.01)

(58) Field of Classification Search
None
See application file for complete search history.

(56) References Cited

U.S. PATENT DOCUMENTS

| | | | |
|---|---|---|---|
| 2007/0180030 A1 | 8/2007 | Xu et al. | |
| 2008/0205452 A1* | 8/2008 | Chou | ............................ 370/493 |
| 2009/0257345 A1* | 10/2009 | King | ............................ 370/216 |
| 2011/0222470 A1* | 9/2011 | Satapathy et al. | ............. 370/328 |
| 2014/0321417 A1* | 10/2014 | Yang et al. | .................... 370/329 |

FOREIGN PATENT DOCUMENTS

| | | |
|---|---|---|
| EP | 2288091 | 2/2011 |
| JP | 2011229022 | 11/2011 |
| JP | 2011250064 A | 12/2011 |
| TW | I271110 | 2/2005 |
| TW | 201006174 A | 2/2010 |
| WO | 2012065390 A1 | 5/2012 |

* cited by examiner

*Primary Examiner* — Duc Duong

(74) *Attorney, Agent, or Firm* — Novak Druce Connolly Bove + Quigg LLP

(57) ABSTRACT

A bandwidth management system and a method adapted for the system. The system determines when the sum of the required bandwidth of a new VOIP call and previous VOIP calls from a client device is greater than the maximum sustained rate, transmits a SIP invite to a called party of the new VOIP call to execute a SIP negotiation via a base station and monitors the new VOIP call and the VOIP calls whose SIP negotiations are not successful. When one of the VOIP calls of awaiting SIP negotiations is successful, the system calculates an actual used bandwidth of the client device, and when the actual used bandwidth is equal to or less than the maximum sustained rate, the system establishes a call link for the one VOIP call and monitoring the other VOIP calls of awaiting SIP negotiations.

14 Claims, 5 Drawing Sheets

VOIP BANDWIDTH MANAGEMENT SYSTEM AND METHOD THEREOF

BACKGROUND

1. Technical Field

The disclosure generally relates to bandwidth management systems, particularly to a bandwidth management system and a bandwidth management method adapted for the system based on the voice over Internet protocol (VOIP).

2. Description of the Related Art

In worldwide interoperability for microwave access (WIMAX), VOIP techniques are very significant. Customer premises equipment (CPE) of the WIMAX system may synchronously establish several VOIP calls. Before establishing a new VOIP call, the CPE needs to obtain a large bandwidth from a base station of the WIMAX system. When determining codec used by the new VOIP call, the CPE updates an actual used bandwidth of the new VOIP call. However, when the CPE synchronously establishes several VOIP calls or there is no time to update the actual used bandwidth of one or more of the several VOIP calls, the sum of required bandwidth of the several VOIP calls will be greater than the maximum bandwidth threshold allowed by the base station of the WIMAX system. Therefore, establishing a new VOIP call will take up more bandwidth than what would be the actually used bandwidth for the new VOIP call, leading that it is hard to establish the new VOIP call due to irrational allocation of bandwidth resources.

Therefore, what is needed is a bandwidth management system to overcome the described shortcoming.

DETAILED DESCRIPTION

Figure 1:
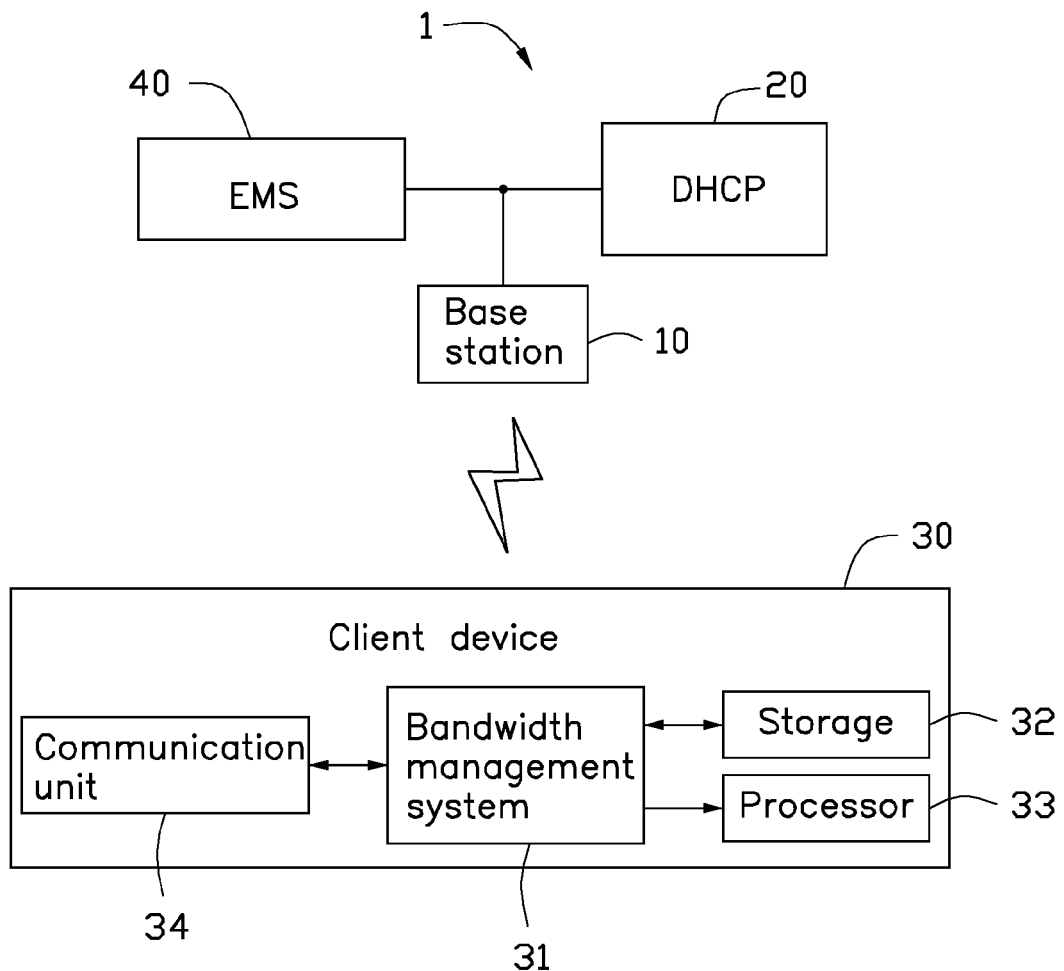
FIG. 1 is a network application diagram of a bandwidth management system in accordance with an exemplary embodiment.
Figure 2:
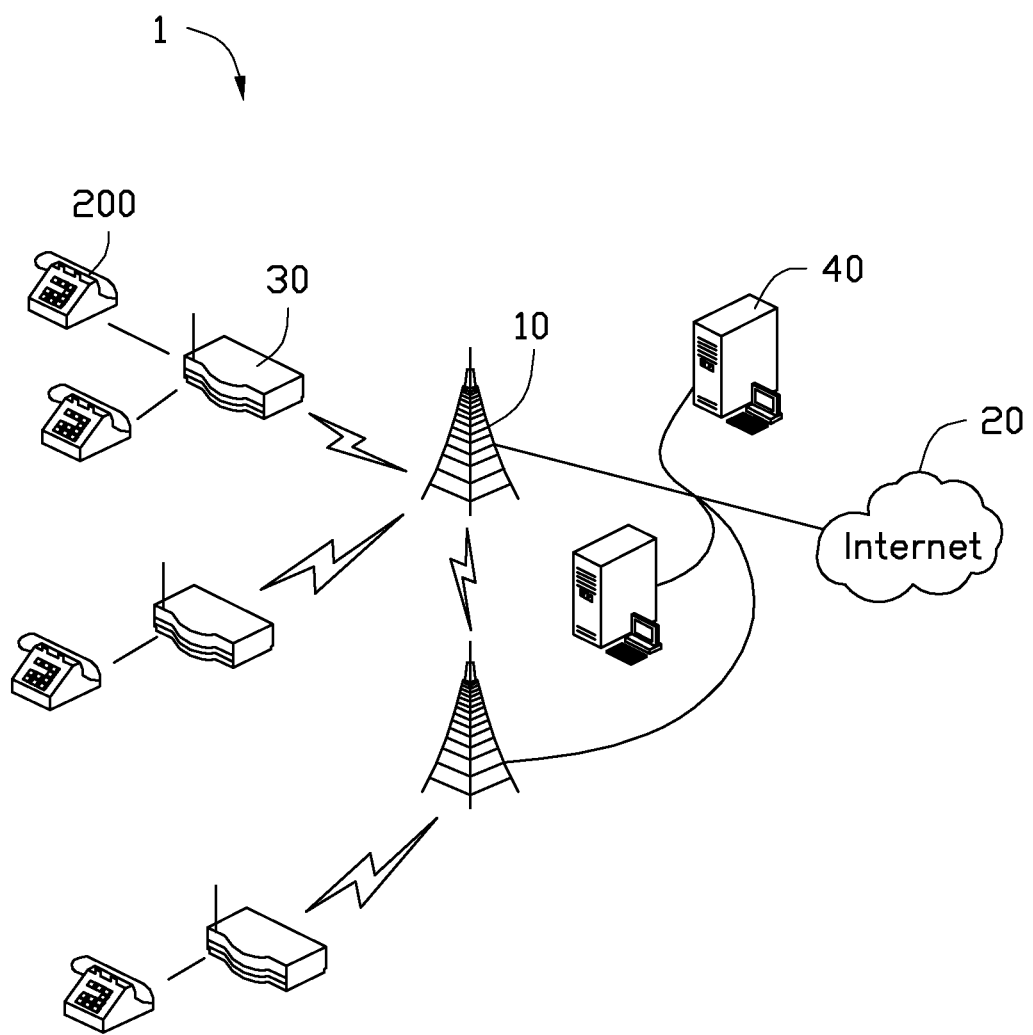
FIG. 2 is a network environment view illustrating the bandwidth management system as shown in FIG. 1.

FIGS. 1 and 2 are a WIMAX network 1 of an exemplary embodiment. The WIMAX network 1 includes at least one base station 10, a dynamic host configuration protocol server (DHCP) 20, a plurality of client devices 30, and an element management system (EMS) 40. The client device 30 is operable to communicate with at least one telephone 200. The client device 30 includes a bandwidth management system 31, a storage 32, a processor 33, and a communication unit 34. The bandwidth management system 31 is used to manage bandwidth of all VOIP calls of the client device 30 according to running conditions of the WIMAX network 1 before establishing a new VOIP call, thereby reasonably utilizing bandwidth resources to establish more new VOIP calls. The storage 32 stores data, for example, the profile of each base station 10. The processor 33 processes data and controls the bandwidth management system 31 to work. The communication unit 34 receives and sends wireless signals. The bandwidth management system 31 may include computerized instructions in the form of one or more programs that are stored in the storage 32, and executed by the processor 33 to provide functions of the client device 30.

The client device 30 establishes a dual communication with the base station 10 via the communication unit 34, and further communicates with the DHCP 20 and the EMS 40 through the base station 10. The base station 10, the DHCP 20, and the EMS 40 communicate with each other via a network, such as the Internet.

The base station 10 is capable of communicating with the client devices 30 located within signal coverage areas of the base station, and processing inquiring commands sent from the EMS 40. The inquiring commands are used to inquire a base station identity code (BSID), frequencies, bandwidth, a carrier to interference plus noise ratio (CINR), and a client capacity usage of the WIMAX system. Additionally, the base station 10 is capable of sending processed results of the inquiring commands back to the EMS 40.

The DHCP 20 is capable of getting an internet protocol (IP) address or a fully qualified domain name (FQDN) of the EMS 40 via a network, and distributing a new IP address to the client devices 30 when receiving DHCP request signals sent from the corresponding client devices 30. The DHCP 20 is also capable of transmitting the IP address or the FQDN of the EMS 40 to the client devices 30.

The client device 30 is capable of getting available WIMAX channels of the base station 10 through scanning operation frequency (e.g., 2.3 GHz or 2.5 GHz), and connecting to the available WIMAX channels in order according to the CINR of the available WIMAX channels. In this exemplary embodiment, the available WIMAX channels can be three channels with greater CINR. The client device 30 connects to the available WIMAX channel with greatest CINR by default, and other available WIMAX channels are regarded as spare channels. In this exemplary embodiment, the CINR difference between the connected channel and the spare channels is less than 3 dB. When the client device 30 communicates with the base station 10, the client device 30 can send the DHCP request signals to the DHCP 20 through the base station 10 to request the DHCP 20 to distribute the new IP address. Meanwhile, when distributing the IP address to the client device 30, the DHCP 20 sends the IP address of the EMS 40 to the client device 30. When the client device 30 gets the new IP address distributed by the DHCP 20 and the IP address or the FQDN of the EMS 40, the client device 30 can exchange authentication information with the EMS 40 so that the client device 30 can download bootstrap programs from the EMS 40, and then communicate with EMS 40.

Figure 3:
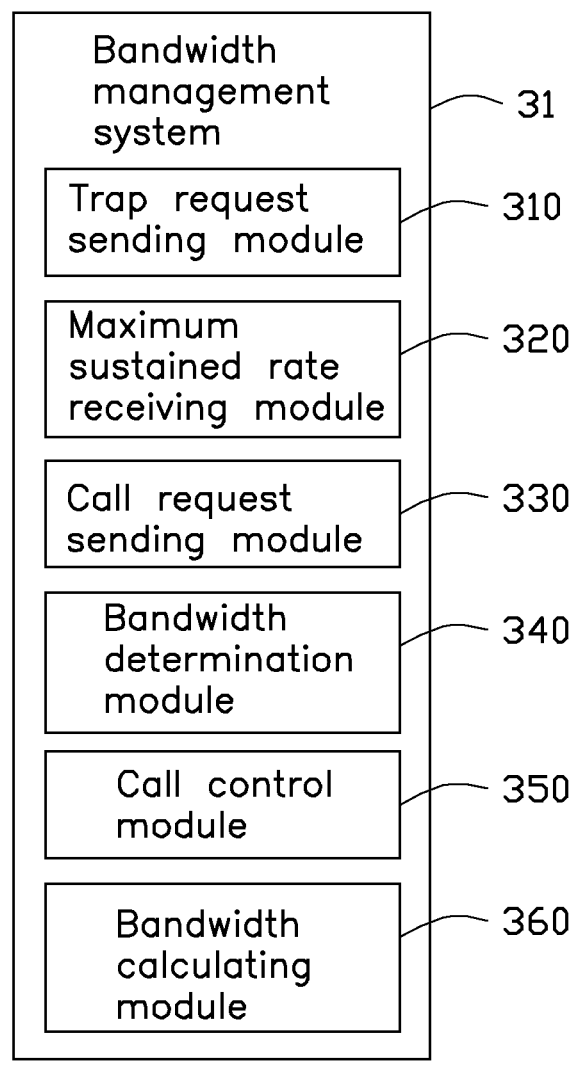
FIG. 3 is a block diagram of the bandwidth management system as shown in FIG. 1.

The bandwidth management system 31 includes a number of modules which are to be executed by the processor 33. As shown in FIG. 3, the number of modules include a trap request sending module 310, a maximum sustained rate receiving module 320, a call request sending module 330, a bandwidth determination module 340, a call control module 350, and a bandwidth calculating module 360.

In case of establishing a communication connection between the client device 30 and the EMS 40, the trap request sending module 310 controls the communication unit 34 to send a predefined trap message to the EMS 40 in order to request the EMS 40 to search the maximum sustained rate set by service flow of unsolicited granted service (UGS) or extended real-time polling service (ERTPS) of a sector of the base station 10 via the base station 10. Meanwhile, the EMS 40 responds to the predefined trap message to acquire the maximum sustained rate from the base station 10 and sends the maximum sustained rate to the client device 30.

The maximum sustained rate receiving module 320 receives the maximum sustained rate from the EMS 40 via the communication unit 34 and stores the maximum sustained rate in the storage 32. Before the client device 30 establishes a new VOIP call, the call request sending module 330 controls the communication unit 34 to send a new VOIP call request to the base station 10 and determines a required bandwidth of a new VOIP call.

The bandwidth determination module 340 determines whether the sum of the required bandwidth of the new VOIP call and previous VOIP calls from the client device 30 is greater than the maximum sustained rate. The previous VOIP calls include calls which are busy and calls whose session initiation protocol (SIP) negotiations are not successful. When the sum of the required bandwidth of the new VOIP call and the previous VOIP calls is less than the maximum sustained rate, that means that current bandwidth of the base station 10 is enough, the call control module 350 successfully establishes the new VOIP call based on a normal process. The normal process is described as follows: the client device 30 transmits an uplink dynamic service addition request (DSA-REQ) to the base station 10 and receives an uplink dynamic service addition response (DSA-RSP) from the base station 10, thereby establishing an uplink service flow; the client device 30 further transmits a downlink DSA-REQ to the base station 10 and receives a downlink dynamic service addition response (DSA-RSP) from the base station 10, thereby establishing a downlink service flow; the client device 30 transmits a SIP invite to a called party of the new VOIP call to execute a SIP negotiation via the base station 10; and when the client device 30 receives a predefined signal from the called party via the base station 10, such as a 200 OK signal, the SIP negotiation of the new VOIP call is successful, that means that the new VOIP call is successfully established.

When the sum of the required bandwidth of the new VOIP call and the previous VOIP calls is equal to or greater than the maximum sustained rate, that means that current bandwidth of the base station 10 is too narrow, the call control module 350 directly transmits the SIP invite to the called party to execute the SIP negotiation of the new VOIP call via the base station 10 and activates a bandwidth management process to monitor the new VOIP call and the VOIP calls whose SIP negotiations are not successful. It is obvious that both the new VOIP call the VOIP calls whose SIP negotiations are awaiting.

The bandwidth management process is described as follows: when the bandwidth determination module 340 determines one of the VOIP calls of awaiting SIP negotiations is successful, the bandwidth calculating module 360 calculates an actual used bandwidth of the client device 30; when the actual used bandwidth is greater than the maximum sustained rate, the call control module 350 terminates all the VOIP calls of awaiting SIP negotiations.

When the actual used bandwidth is equal to or less than the maximum sustained rate, the call control module 350 establishes a call link for the one of the VOIP calls of awaiting SIP negotiations and the bandwidth management system 31 continues to monitor the other VOIP calls of awaiting SIP negotiations. When all the VOIP calls of awaiting SIP negotiations do not exist, that means that all the VOIP calls of awaiting SIP negotiations were successful or all the VOIP calls of awaiting SIP negotiations were terminated, the bandwidth calculating module 360 calculates the actual used bandwidth of the client device 30 based on dynamic service change (DSC).

Figure 4A:
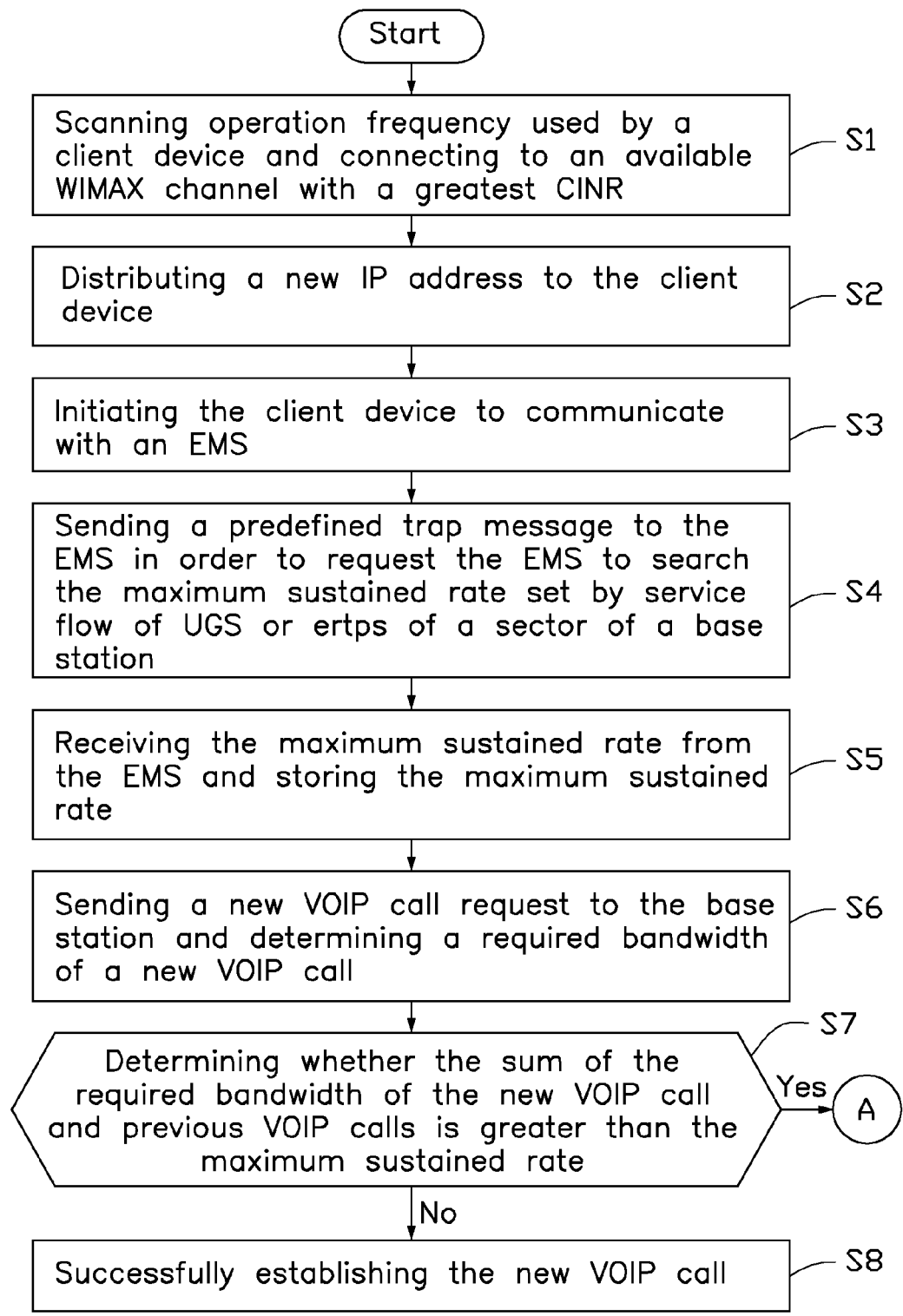
FIGS. 4A-4B are flowcharts illustrating a bandwidth management method in accordance with an exemplary embodiment.
Figure 4B:
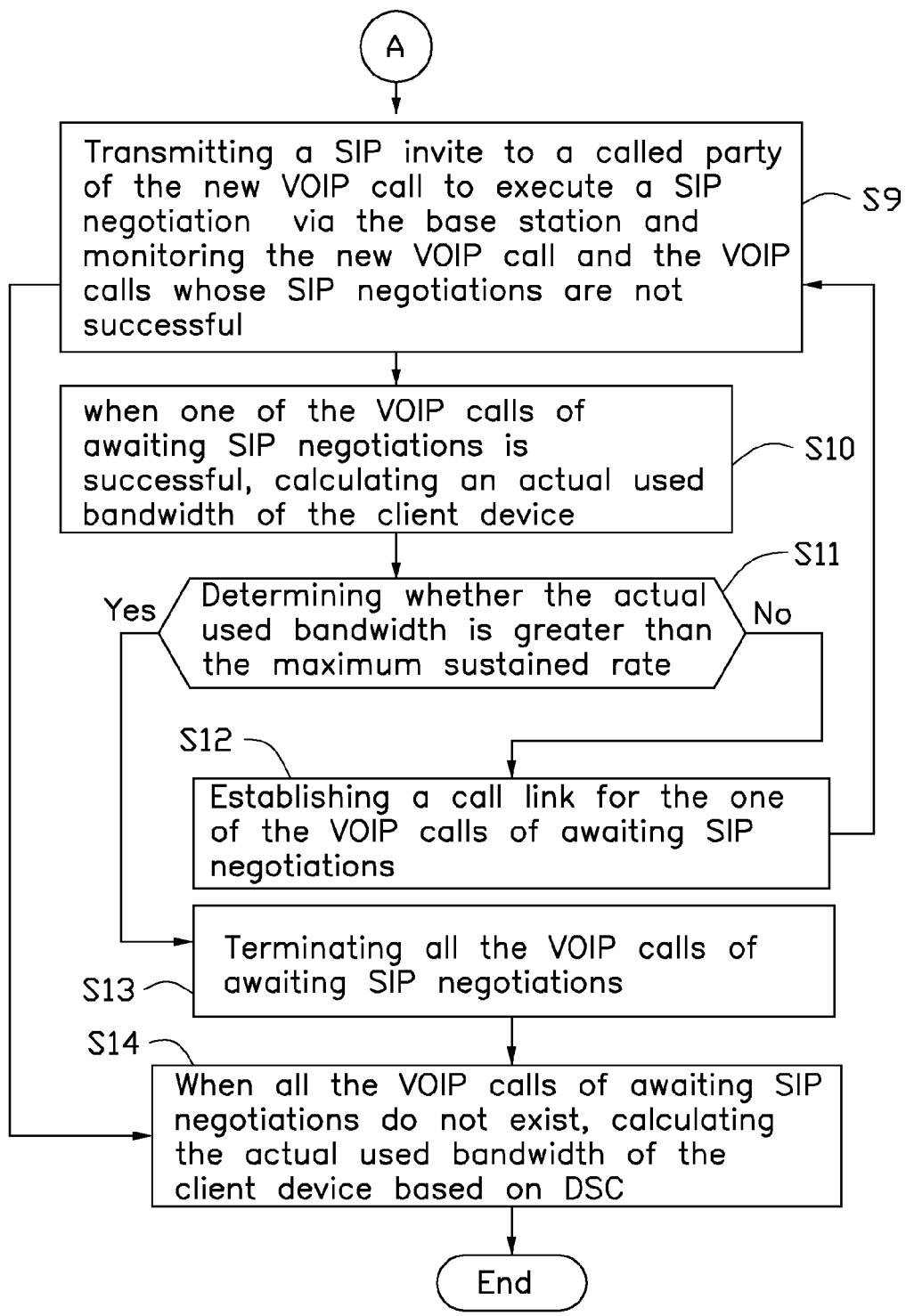

FIGS. 4A-4B show a bandwidth management method according to an exemplary embodiment. The bandwidth management method can use the aforementioned bandwidth management system 31 and may at least include the following steps.

In step S1, the client device 30 scans the operation frequency in use to get the available WIMAX channels, and then connects to the available WIMAX channel with the largest CINR.

In step S2, the client device 30 transmits DHCP request signals to the DHCP 20 through the base station 10, and the DHCP 20 distributes a new IP address to the client device 30; and then transmits the IP address or the FQDN of the EMS 40 to the client device 30.

In step S3, the client device 30 begins to initialize, exchanges the authentication information with the EMS 40 and downloads the bootstrap programs from the EMS 40, and then analyzes and updates the bootstrap programs. Thus, the client device 30 can upload the bootstrap programs to the EMS 40 to communicate with the EMS 40.

In step S4, the trap request sending module 310 controls the communication unit 34 to send a predefined trap message to the EMS 40 in order to request the EMS 40 to search the maximum sustained rate set by service flow of unsolicited granted service (UGS) or extended real-time polling service (ERTPS) of a sector of the base station 10 via the base station 10.

In step S5, the maximum sustained rate receiving module 320 receives the maximum sustained rate from the EMS 40 via the communication unit 34 and stores the maximum sustained rate in the storage 32.

In step S6, before the client device 30 establishes a new VOIP call, the call request sending module 330 controls the communication unit 34 to send a new VOIP call request to the base station 10 and determines a required bandwidth of a new VOIP call.

In step S7, the bandwidth determination module 340 determines whether the sum of the required bandwidth of the new VOIP call and previous VOIP calls from the client device 30 is greater than the maximum sustained rate.

In step S8, when the sum of the required bandwidth of the new VOIP call and the previous VOIP calls is less than the maximum sustained rate, the call control module 350 establishes the new VOIP call.

In step S9, when the sum of the required bandwidth of the new VOIP call and the previous VOIP calls is equal to or greater than the maximum sustained rate, the call control module 350 transmits the SIP invite to the called party to execute the SIP negotiation of the new VOIP call via the base station 10 and monitors the new VOIP call and the VOIP calls whose SIP negotiations are not successful.

In step S10, when the bandwidth determination module 340 determines that one of the VOIP calls of awaiting SIP negotiations is successful, the bandwidth calculating module 360 calculates an actual used bandwidth of the client device 30.

In step S11, the bandwidth determination module 340 determines whether the actual used bandwidth is greater than the maximum sustained rate.

In step S12, when the actual used bandwidth is equal to or less than the maximum sustained rate, the call control module 350 establishes a call link for the one of the VOIP calls of awaiting SIP negotiations and continues to monitor the other VOIP calls of awaiting SIP negotiations, the procedure returns the step S9.

In step S13, when the actual used bandwidth is greater than the maximum sustained rate, the call control module 350 terminates all the VOIP calls of awaiting SIP negotiations.

In step S14, when all the VOIP calls of awaiting SIP negotiations do not exist, the bandwidth calculating module 360 calculates the actual used bandwidth of the client device 30 based on dynamic service change (DSC).

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A bandwidth management system for WIMAX network, wherein the WIMAX network comprises a base station, a client device, and an element management system (EMS), the client device establishes a dual communication with the base station, and further communicates with the EMS through the base station, both the base station and the EMS communicate with each other via the Internet, the system comprising:
   a trap request sending module to send a predefined trap message to the EMS in order to request the EMS to search a maximum sustained rate set by service flow of unsolicited granted service or extended real-time polling service of a sector of the base station via the base station;
   a maximum sustained rate receiving module to receive the maximum sustained rate from the EMS and store the maximum sustained rate;
   a call request sending module to send a new VOIP call request to the base station and determine a required bandwidth of a new VOIP call;
   a bandwidth determination module to determine whether a sum of the required bandwidth of the new VOIP call and a previous VOIP calls from the client device is greater than the maximum sustained rate, wherein the previous VOIP calls comprise calls which are busy and calls whose session initiation protocol (SIP) negotiations are not successful;
   a call control module to transmit a SIP invite to a called party of the new VOIP call to execute a SIP negotiation via the base station and monitor the new VOIP call and the VOIP calls whose SIP negotiations are not successful when the sum of the required bandwidth of the new VOIP call and the previous VOIP calls is equal to or greater than the maximum sustained rate; and
   a bandwidth calculating module to calculate an actual used bandwidth of the client device when the bandwidth determination module determines that one of the VOIP calls of awaiting SIP negotiations is successful;
   wherein when the actual used bandwidth is equal to or less than the maximum sustained rate, the call control module is further configured to establish a call link for the one of the VOIP calls of awaiting SIP negotiations and the bandwidth management system monitors the other VOIP calls of awaiting SIP negotiations; and
   these modules of the bandwidth management system is to executed by at least one processor.

2. The bandwidth management system as claimed in claim 1, wherein when the sum of the required bandwidth of the new VOIP call and the previous VOIP calls is less than the maximum sustained rate, the call control module is further configured to successfully establish the new VOIP call.

3. The bandwidth management system as claimed in claim 1, when the actual used bandwidth is greater than the maximum sustained rate, the call control module is further configured to terminate all the VOIP calls of awaiting SIP negotiations.

4. The bandwidth management system as claimed in claim 1, wherein when all the VOIP calls of awaiting SIP negotiations do not exist, the bandwidth calculating module is further configured to calculate the actual used bandwidth of the client device based on dynamic service change (DSC).

5. The bandwidth management system as claimed in claim 1, wherein the client device further communicates with a dynamic host configuration protocol server (DHCP), where the DHCP is operable to get an internet protocol (IP) address or a fully qualified domain name (FQDN) from the EMS and transmit the IP address or the FQDN to the client device.

6. The bandwidth management system as claimed in claim 5, wherein the DHCP is operable to distribute a new IP address to the client device.

7. The bandwidth management system as claimed in claim 1, wherein the one or more programs are further executed by the processor to download bootstrap programs from the EMS and update the bootstrap programs using the client device, and upload the updated bootstrap programs to the EMS.

8. A bandwidth management method for WIMAX network, wherein the WIMAX network comprises a base station, a client device, and an element management system (EMS), the client device establishes a dual communication with the base station, and further communicates with the EMS through the base station, both the base station and the EMS communicate with each other via the Internet, the method comprising:
   sending a predefined trap message to the EMS in order to request the EMS to search a maximum sustained rate set by service flow of unsolicited granted service (UGS) or extended real-time polling service (ertps) of a sector of the base station via the base station;
   receiving the maximum sustained rate from the EMS and storing the maximum sustained rate;
   sending a new VOIP call request to the base station and determining a required bandwidth of a new VOIP call;
   determining whether a sum of the required bandwidth of the new VOIP call and a previous VOIP calls from the client device is greater than the maximum sustained rate, wherein the previous VOIP calls comprise calls which are busy and calls whose session initiation protocol (SIP) negotiations are not successful;
   when the sum of the required bandwidth of the new VOIP call and the previous VOIP calls is equal to or greater than the maximum sustained rate, transmitting a SIP invite to a called party of the new VOIP call to execute a SIP negotiation via the base station and monitoring the new VOIP call and the VOIP calls whose SIP negotiations are not successful;
   when one of the VOIP calls of awaiting SIP negotiations is successful, calculating an actual used bandwidth of the client device; and
   when the actual used bandwidth is equal to or less than the maximum sustained rate, establishing a call link for the one of the VOIP calls of awaiting SIP negotiations and monitoring the other VOIP calls of awaiting SIP negotiations.

9. The bandwidth management method as claimed in claim 8, further comprising:
   when the sum of the required bandwidth of the new VOIP call and the previous VOIP calls is less than the maximum sustained rate, successfully establishing the new VOIP call.

10. The bandwidth management method as claimed in claim 8, further comprising:
    when the actual used bandwidth is greater than the maximum sustained rate, terminating all the VOIP calls of awaiting SIP negotiations.

11. The bandwidth management method as claimed in claim 8, further comprising:

when all the VOIP calls of awaiting SIP negotiations do not exist, calculating the actual used bandwidth of the client device based on dynamic service change (DSC).

12. The bandwidth management method as claimed in claim 8, wherein the client device further communicates with a dynamic host configuration protocol server (DHCP), where the DHCP is operable to get an internet protocol (IP) address or a fully qualified domain name (FQDN) from the EMS and transmit the IP address or the FQDN to the client device.

13. The bandwidth management method as claimed in claim 12, wherein the DHCP is operable to distribute a new IP address to the client device.

14. The bandwidth management method as claimed in claim 8, wherein the one or more programs are further executed by the processor to download bootstrap programs from the EMS and update the bootstrap programs using the client device, and upload the updated bootstrap programs to the EMS.

\* \* \* \* \*